United States Patent
Pohl et al.

(10) Patent No.: US 8,361,253 B2
(45) Date of Patent: Jan. 29, 2013

(54) HEAT TREATMENT OF FLEXIBLY ROLLED STRIP

(75) Inventors: Stefan Pohl, Wenden (DE); Andreas Hauger, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 1166 days.

(21) Appl. No.: 12/221,598

(22) Filed: Aug. 5, 2008

(65) Prior Publication Data

US 2009/0050622 A1 Feb. 26, 2009

(30) Foreign Application Priority Data

Aug. 20, 2007 (DE) .......................... 10 2007 039 279

(51) Int. Cl.
*C21D 1/04* (2006.01)
*C21D 1/54* (2006.01)

(52) U.S. Cl. ........ 148/509; 148/500; 148/567; 148/575; 219/602

(58) Field of Classification Search .................. 148/500, 148/567, 568, 575, 509; 219/602
See application file for complete search history.

(56) References Cited

U.S. PATENT DOCUMENTS

| | | | |
|---|---|---|---|
| 5,582,790 A | 12/1996 | Ferry et al. | |
| 6,891,139 B2 * | 5/2005 | Iijima et al. | 219/667 |
| 7,087,869 B2 * | 8/2006 | Eguchi et al. | 219/602 |
| 7,459,053 B2 * | 12/2008 | Bone, Jr. | 156/272.2 |

FOREIGN PATENT DOCUMENTS

| | | |
|---|---|---|
| DE | 1803129 A1 | 4/1970 |
| DE | 102004023886 A1 | 12/2005 |
| EP | 0107991 A1 | 5/1984 |
| EP | 0353749 A2 | 7/1990 |
| EP | 0561667 A1 | 9/1993 |
| EP | 1610591 A1 | 12/2005 |
| JP | 60002634 | 1/1985 |
| JP | 2006241537 | 9/2009 |
| WO | 2006088067 A1 | 8/2006 |

OTHER PUBLICATIONS

German Search Report for Application No. 10 2007 039 279 dated Feb. 28, 2008.
European Search Report for Application No. 08 013 048.7 dated Dec. 10, 2008.
Benninghoff, Hwärmebehandlung der Bau-und Werkzeugstähle, Apr. 24, 1978.

* cited by examiner

*Primary Examiner* — Deborah Yee
(74) *Attorney, Agent, or Firm* — MacMillan, Sobanski & Todd, LLC

(57) ABSTRACT

The invention relates to a process for the continuous heat treatment of steel strip material whose thickness $d_1$, $d_2$ periodically varies along its length, more particularly of strip flexibly rolled with a roll gap varying as a function of time, wherein the continuous heat treatment of the strip material takes place while the strip material passes through an induction furnace in which the strip material is induction heated at a constant frequency which can be selected to be such that the mathematical induction depth $\delta$ of the induced current up to which the magnetic field has been reduced to 63% of the field strength of the outer field is greater than half the thickness of the strip portions with the smallest thickness $d_2$.

20 Claims, 6 Drawing Sheets

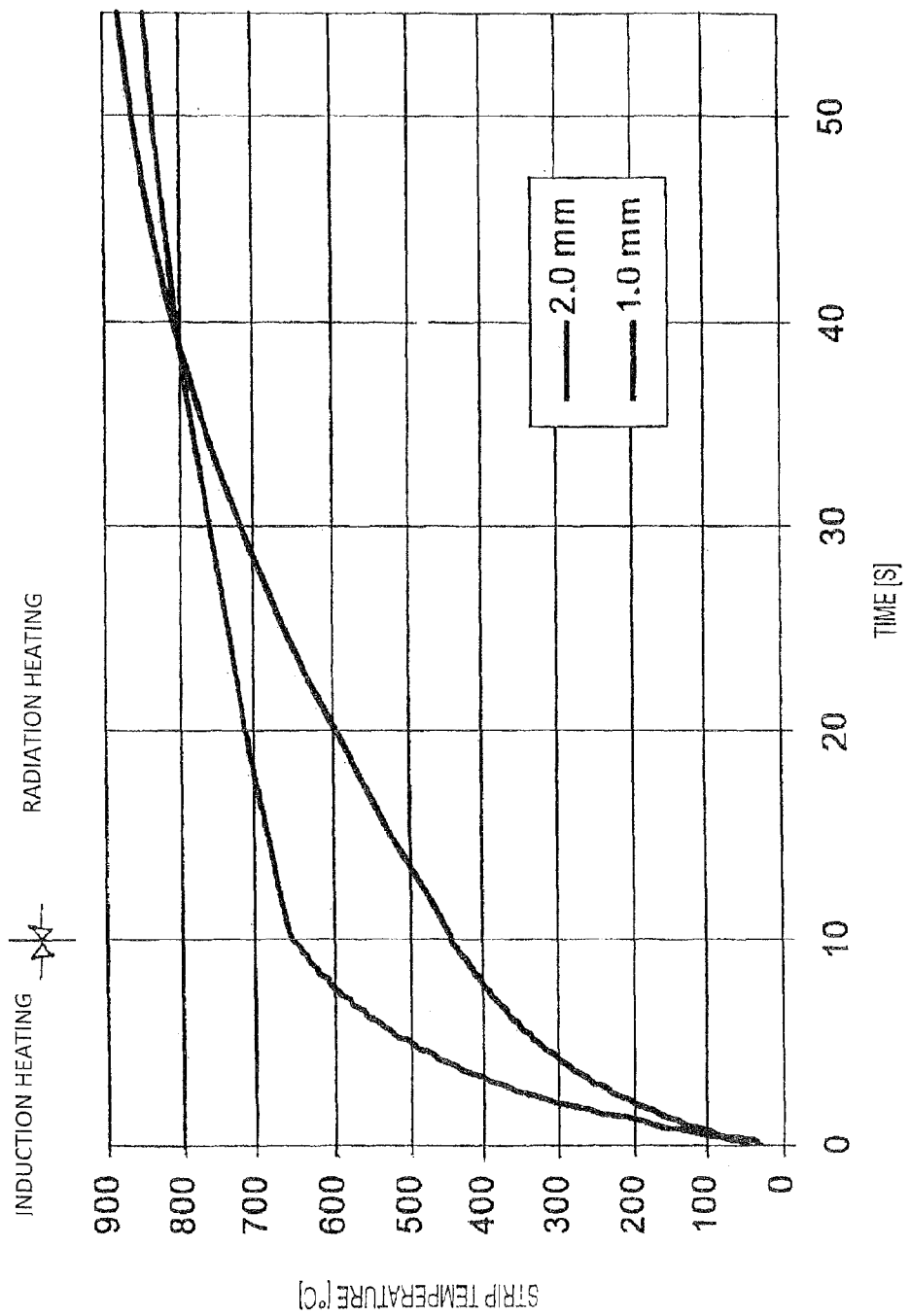

HEAT TREATMENT OF FLEXIBLY ROLLED STRIP

BACKGROUND

The invention relates to a process for the continuous heat treatment of steel strip material whose thickness ($d_1$, $d_2$) periodically varies along its length. Such strip material is produced continuously under the name of flexibly rolled strip with a roll gap varying as a function of time.

Flexibly rolled strip with periodically variable plate thicknesses can be produced by cold rolling. After having been cold-rolled, the strip material is normally heat-treated in order to reduce the amount of strain hardening introduced during cold rolling and thus to improve again the plastic deformability of the strip material. It is known to heat complete coils in high-convection hood-type annealing furnaces. However, the annealing cycle in such cases is very long because the material is treated at heating rates of less than 0.1 K/sec and cooling rates of less than 0.01 K/sec.

However, for producing the polyphase structure, polyphase steels require rapid heating and cooling rates which cannot be achieved by high-convention hood-type annealing furnaces. Therefore, polyphase steels when passing through the furnace have to be heat-treated continuously. In the process, the strip material is unwound from the coil and the strip, in one or several furnaces adjusted to one another, i.e. mainly radiation and high-convection furnaces. The strip material is heated as far as the αγ-range and held prior to being quenched in a high-speed cooling device, whereby, provided a suitable strip material quality has been selected, the different phase portions of a polyphase steel can be formed.

Induction heating forms part of the electrical heating processes wherein the thermal energy is produced by resistance heat directly in the workpiece or strip in this case. In the case of longitudinal field heating, the magnetic field extends parallel to the surface of the strip, as a result of which eddy currents are induced in the strip. The eddy currents also extend parallel to the strip surface on both sides of the strip in the opposite directions. Eddy currents can lead to the formation of internal heat sources which heat the strip. The magnetic alternating field and the current density decrease from the material edge towards the strip interior. The penetration depth δ describes the distance from the material edge at which the magnetic field has been reduced to 63% of the outer field.

The penetration depth δ thus describes the distance from the surface at which amplitudes of the magnetic and electric field strength have decreased by 37%, i.e. by the factor 1/e. In the case of a thin strip, the operation takes place mainly with penetration depths δ<0.4 d (d=thickness of strip), so that the currents inside the strip do not cancel each other out. The heat is thus generated in an outer edge layer and, through heat conduction, reaches the strip interior. The penetration depth δ can be set via the selection of the frequency f.

The penetration depth σ is calculated as follows:

$$\delta = \frac{1}{2\pi} \cdot \sqrt{\frac{\rho \cdot 10^7}{f \cdot \mu}}$$

with ρ=specific electric resistance
f=frequency
μ=permeability.

When strip material with a periodically variable thickness, i.e. flexibly rolled strip, is subjected to this kind of heat treatment, a problem can occur in that the strip regions with different thicknesses can become heated at different speeds in radiation and convection furnaces. With a basically identical heat input rate inside the furnace, the temperature of the thin strip portions is substantially higher at the furnace exit than that of the thicker strip portions. In principle, this also applies to induction furnaces in which, by selecting a certain frequency, a certain penetration depth of the induced current can be generated. This penetration depth can be identical in thick and thin strip portions, with the heat input being approximately proportional to the penetration depth δ. Accordingly, the thinner strip portions, due to their smaller mass, can be heated to a higher temperature than the thicker strip portions.

SUMMARY

Independently of the type of heating during the subsequent further heat treatment stages, such as during quenching, the different exit temperatures can prevent the production of strip material with homogeneous characteristics in regions having different thicknesses of flexibly rolled strip.

It is therefore an object of the present invention to provide a process which makes it possible to heat strip material having different plate thicknesses in the longitudinal direction to variably set temperatures, and providing a predetermined thickness ratio/mass ratio of the strip portions with different thicknesses. The objective is achieved by providing a continuous heat treatment of the strip material while the strip material passes through an induction furnace. In the induction furnace, the strip material is induction heated at a constant frequency which has been selected to be such that the mathematical induction depth δ of the induced current up to which the magnetic field has been reduced to 63% field strength of the outer field is greater than half the thickness of the strip portions with the smallest thickness ($d_2$).

The mathematical penetration depth theoretically refers to a member with an infinite thickness. In this case, the penetration depth δ is the thickness of a fictitious layer in the entire induced, homogeneously distributed current would flow. For example, the thickness of the fictitious layer can be determined by the reduction in field strength by the factor 1/e=37%, thus with a residual field strength of 63%. The penetration depth is material-and frequency-dependent.

The effect achieved is that in the region of the small strip thickness, the mathematical penetration depths δ of the induced currents in the strip material overlap from both sides, with the induced currents cancelling each other out in the region of overlap, so that induction heating does not take place in the entire material.

The amount of energy effectively introduced is thus smaller in a thinner region ($d_2$) than in a thicker region ($d_1$), with the penetration depth remaining freely selectable, especially in a thicker region. Increasing the calculated penetration depth δ has less of an effect on the heat input in the thinner region, but continues to substantially determine the heating rate of the thicker region. According to a preferred embodiment, the strip material is induction-heated with a constant frequency which has been selected to be such that the mathematical induction depth δ of the induced current up to which the magnetic field has been reduced to 63% of the field strength of the outer field is smaller than half the thickness of the strip portions with the greatest thickness ($d_1$).

It is thus possible to select the frequency of the induced current in such a way that in the region of greater thicknesses, penetration depths can be effectively realised which are greater than half the thickness of the thin strip material, i.e. in the thicker strip material the penetration depth has to be increased to such an extent that the heat input is maximised. The heat input into the thick regions can thus be substantially increased, whereas the heat input into the thinner strip regions can be much less.

According to a process according to the invention, it is possible to deliberately set differentiated end temperatures at the end of the run through the induction furnace, by providing different heat input levels into the strip regions with different thicknesses. For another process according to the invention, it is possible to set certain uniform end temperatures in all strip regions at the end of the run.

Further heat treatment stages can be used to provide substantially homogeneous material properties in the thick strip regions and in the thin strip regions, but alternatively can allow the deliberate and controlled setting of inhomogeneous material properties in the strip regions of different thicknesses. For example, it is possible to produce the thinner regions with a deliberately higher or lower strength than the thicker strip regions.

As induction heat treatment in the longitudinal field inductor depends upon the ferromagnetic properties of the material, which properties can be lost for some material at a Curie temperature of 769° C. Accordingly, induction heating of the type described here is economically sensible only up to the Curie temperature. In order to achieve temperatures in excess of 700° C. for re-crystallization annealing or temperatures in excess of 800° C. for subsequent hardening, it is proposed that following induction heating, the strip material furnace is heated to a further even higher temperature, when passing through a convection furnace or a radiation.

It has been found to be advantageous to subject the strip material to induction heating for approximately 10 seconds to induction heating and to convection or radiation heating to a temperature in excess of 800° C. for approximately 40 seconds. If a suitable alloy steel is used, the strip material can subsequently be quenched at a higher cooling rate which leads to the formation of martensite and thus to the setting of a polyphase structure, for example accompanied by the formation of martensite. Further preferred process characteristics are described in the sub-claims to which reference is hereby made.

For example, a process for the continuous heat treatment of steel strip material whose thickness ($d_1$, $d_2$) periodically varies along its length is provided. More particularly, a strip flexibly rolled is provided with a roll gap varying as a function of time, wherein the continuous heat treatment of the strip material takes place while the strip material passes through an induction furnace. In the induction furnace, the strip material is induction heated at a constant frequency which has been selected to be such that the mathematical induction depth $\delta$ of the induced current up to which the magnetic field has been reduced to 63% of the field strength of the outer field is greater than half the thickness of the strip portions with the smallest thickness ($d_2$).

In addition, the process can be provided wherein the strip material is induction-heated with a constant frequency which has been selected to be such that the mathematical induction depth $\delta$ of the induced current up to which the magnetic field has been reduced to 63% of the field strength of the outer field is smaller than half the thickness of the strip portions with the greatest thickness ($d_1$).

Alternatively, the process can be performed wherein the strip portions with different thicknesses ($d_1$, $d_2$) are induction heated to an approximately identical end temperatures or to differentiated end temperatures.

In an alternative process, the strip material can also be heated in a longitudinal field inductor. Furthermore, a process can be provided wherein the strip material can be induction heated, at most, to the Curie temperature (769° C.), or induction heated at a heating rate greater than 20 K/sec.

In an additional embodiment, the process can include the step of heating the strip material to an even higher temperature, while passing through a convection or radiation furnace following the induction heating process. More particularly, the strip portions of different thicknesses ($d_1$, $d_2$), can be heated to an approximately identical end temperature in the induction or radiation furnace.

Alternatively, the strip portions of different thicknesses ($d_1$, $d_2$), can be heated to differentiated end temperatures in the induction or radiation furnace. Furthermore, the process can be provided wherein the strip material is cooled at a cooling rate in excess of 40 K/sec after having been heated in the convection or radiation furnace. In another alternative embodiment, the strip material can be selected to have suitable quality and cooled at a cooling rate for forming polyphase steel.

Furthermore, the invention relates to a system for carrying out the above described processes. A system according to the invention comprises at least one induction furnace, more particularly with a longitudinal field conductor, at least one convection or radiation furnace and a high-speed cooling device, with all the above being connected in series.

BRIEF DESCRIPTION OF THE DRAWINGS

Below, the invention is explained further with reference to some illustrations of the design principle and diagrams.

FIG. 6 illustrates an example of a temperature curve for two different plate thicknesses when combining induction heating and radiation heating as a function of time.

DETAILED DESCRIPTION

Figure 1:
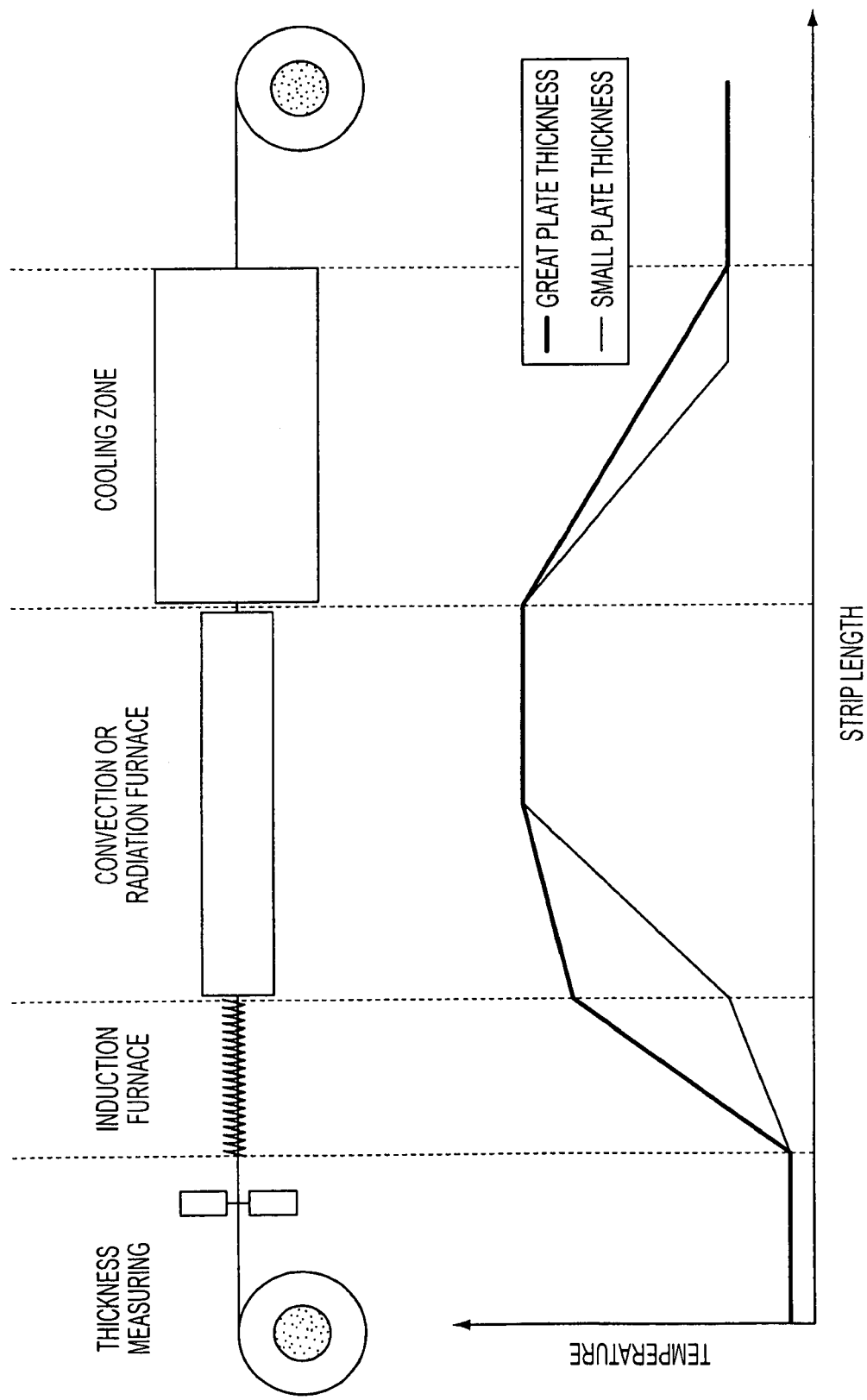
FIG. 1 illustrates a system for carrying out the inventive process and a simplified illustration of the temperature curve along the treated strip length.

FIG. 1, in its upper half, shows the design principle of a system for carrying out a heat treatment process in accordance with the invention. An unwinding coil 11 is shown on the left and a winding coil 12 is shown on the right, between which a wound-off strip 13 is provided. Between the coils 11 and 12, the strip can be passed through one or more system stations of a plate thickness measuring facility 14, an induction furnace 15, a convention or radiation furnace 16 and devices of a cooling zone 17. The strip length temperature diagram shows the temperature curve for the above-shown strip length for strip portions having a greater plate thickness (thick line) and for strip portions having a smaller plate thickness (thin line). Until it enters the induction furnace 15, the strip—independently of its thickness—can retain its starting temperature, which can be the ambient temperature. In accordance with a process according to the invention, the temperature in the induction furnace 15 can be controlled and increased in regions of greater plate thickness, and to a more considerable extent than in regions of smaller plate thicknesses. For at least this reason, the process differs from a prior art induction heating process wherein a reverse result would be expected. In a convection or radiation furnace 16, if the different starting temperature is ignored and with approximately the same heat input, the smaller masses of regions having a smaller plate thickness can become heated to a greater extent than the larger masses of regions having a greater wall thickness until the temperatures of both regions have been equalised. In the adjoining cooling zone, the strip can be cooled back to a quenching temperature, with the cooling process provided at a somewhat higher rate in regions having smaller plate thickness than in regions having greater plate thickness. The material properties achieved are approximately homogeneous in both thickness regions.

Figure 2:
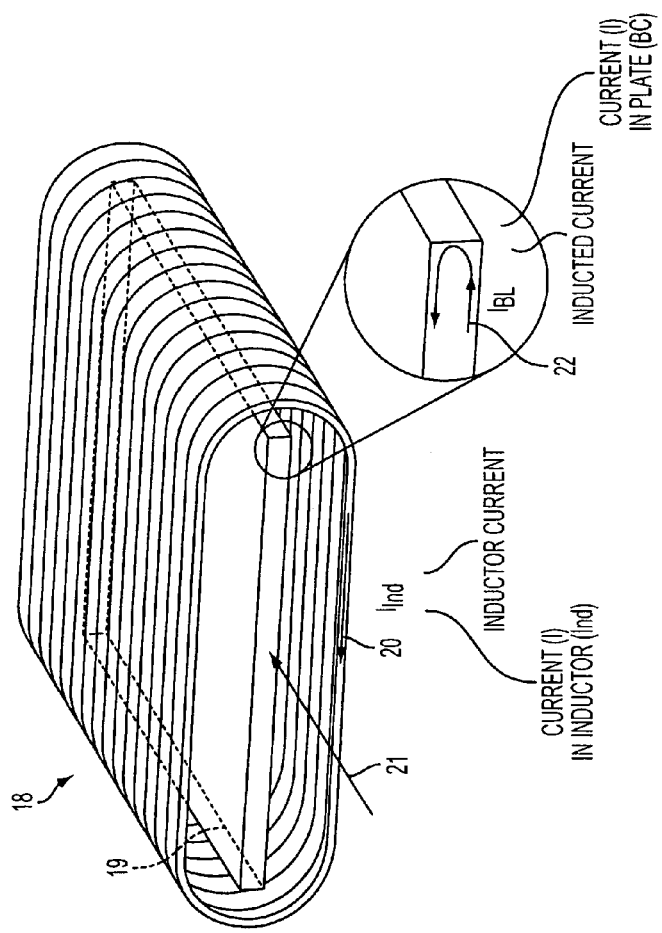
FIG. 2 illustrates a longitudinal field inductor with a continuous plate.

FIG. 2 shows the design principles of a longitudinal field inductor 18 of an induction furnace according to the invention together with a plate 19 passing through. The flow of current in inductor $I_{Ind}$ is indicated by an arrow 20 and the direction of movement of the strip by an arrow 21. In an enlarged detail, the arrow 22 indicates the direction of the current $I_{B1}$ in the plate, which is initiated by the inductor. It can be seen that the induction flows, which start from the two surfaces, extend in the opposite direction, transversely to the direction of movement of the plate. The plate, in this case, can be regarded as a strip portion.

Figure 3:
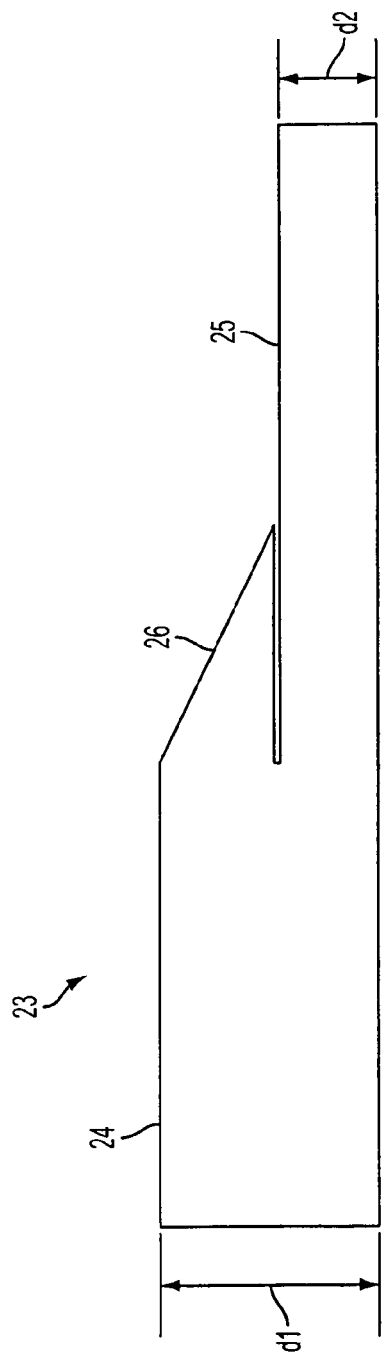
FIG. 3 illustrates the thickness ratios of the strip material used.

FIG. 3, shows a longitudinal section of the flexibly rolled strip material 23, wherein the thickness d1 of a strip portion 24 having a greater plate thickness and the thickness d2 of a strip portion 25 having a smaller plate thickness are shown. When the roll gap is changed, a constant transition 26 can be achieved which, however, can now be disregarded.

Figure 4:
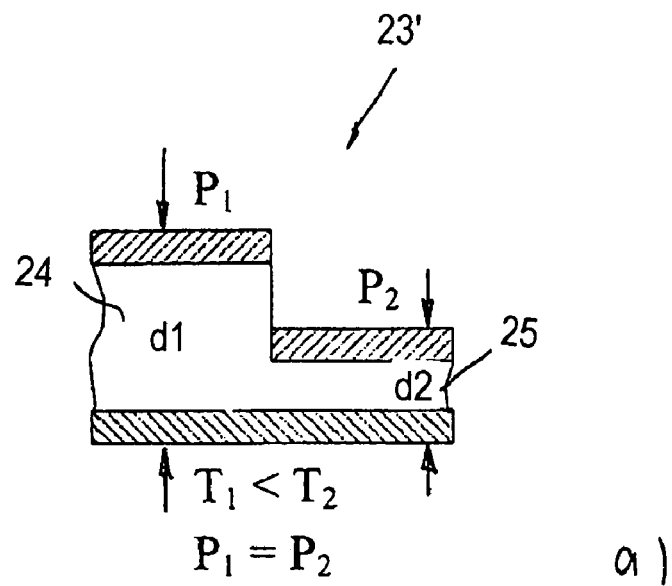
FIG. 4 illustrates an example of the penetration depth when induction heating a strip material according to FIG. 3
a) according to the state of the art, and
b) according to the invention.
Figure 4:
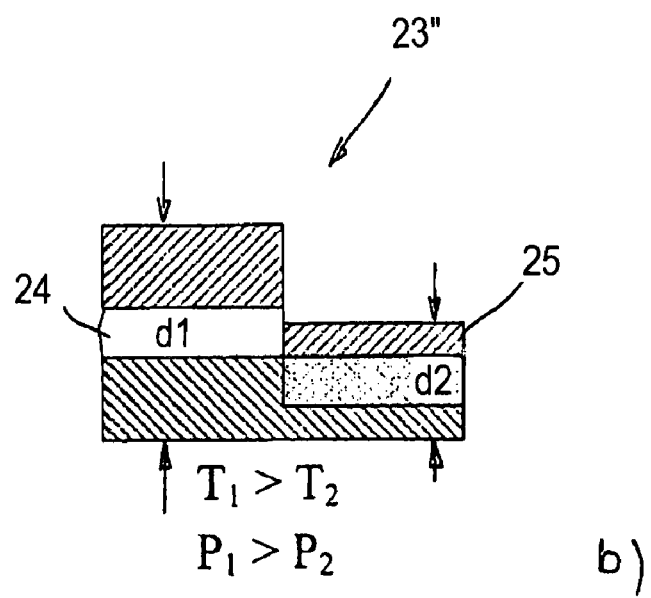

FIG. 4, illustrates an example of the strips portions 23', 23" with a portion 24 having greater thickness $d_1$ and a portion 25 having a smaller thickness $d_2$. These portions are shown to have penetration depths by means of hatched lines, a) when induction heated in accordance with the state of the art and b) when induction heated in accordance with the invention.

As shown in illustration 4a), heat input P1 can be applied in region 24 having a greater thickness, wherein the heat input P1 is as high as the heat input P2 applied in the region 25 having a smaller thickness. Taking into account the different thicknesses d1, d2 and thus also the different masses, an end temperature T1 can result in the thicker region 24, which is less than the end temperature T2 in the thinner region 25.

As shown in illustration 4b), a lower frequency can be provided so that region 24 can be provided with penetration depths which are greater than the thickness d2 of the thinner region 25. As a result, the penetration depth regions in the thinner region 25 can overlap. In the region of overlap, the induced currents can cancel each other out, so that, effectively, only a heat input in the remaining regions occurs. The heat input P1 in the thicker region 24 can be substantially greater than the heat input P2 in the thinner region 25, so that the end temperature T1 in the thicker region 24 can be made to reach a higher value than the end temperature T2 in the thinner region 25.

Figure 5:
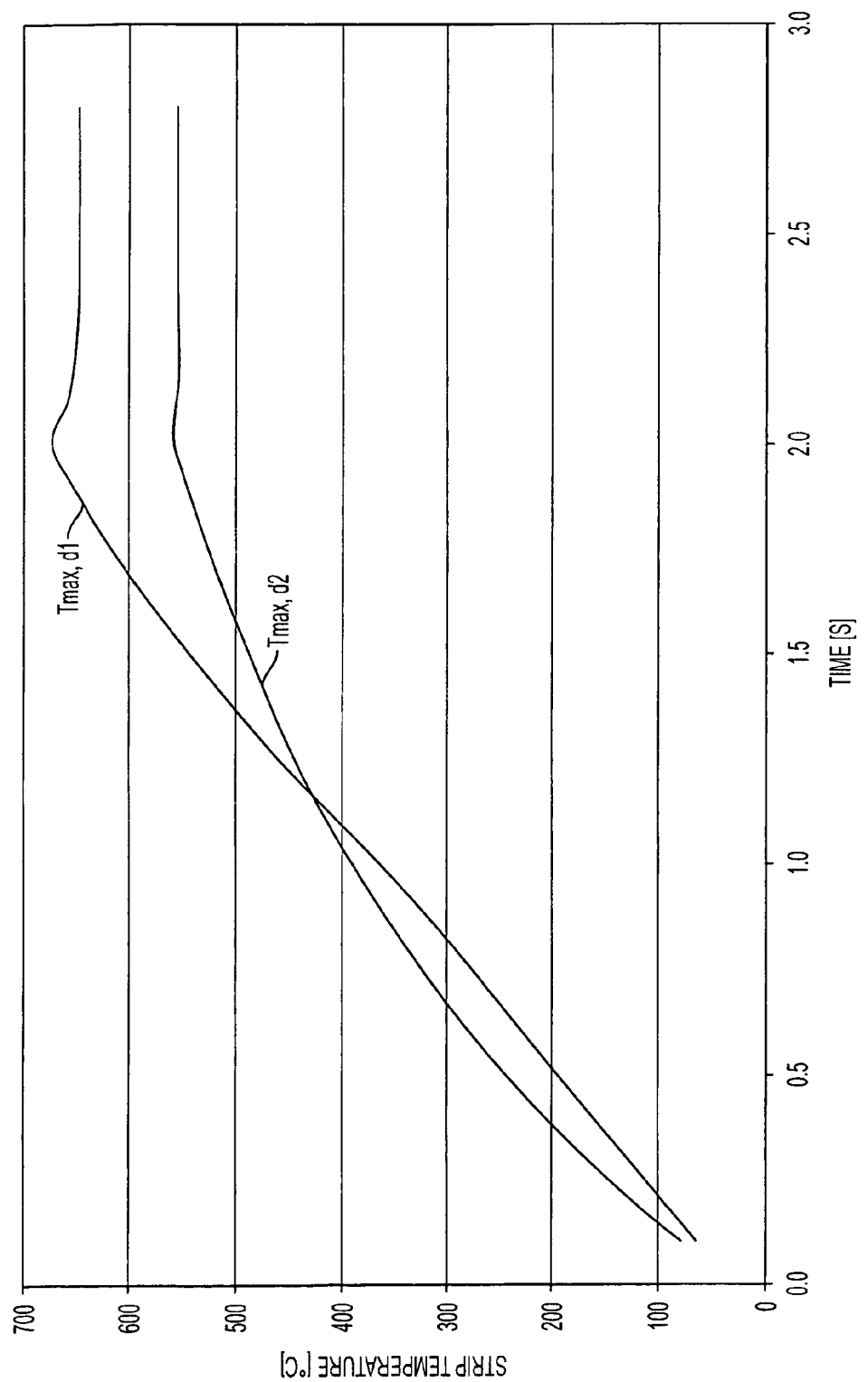
FIG. 5 illustrates an example of a temperature curve for two different plate thicknesses with a predetermined 3.48 Hz operating frequency for induction hardening.

FIG. 5 illustrates an example of a temperature curve for the process technology illustrated in FIG. 4b for the regions having a plate thickness d1 of 4 mm and a plate thickness d2 of 2 mm at a frequency of 3.48 Hz for a period of 2 seconds. Initially, the temperature can increase to a lesser extent in the thicker region, whereas the temperature increases to a greater extent in the thinner region. Identical temperatures of 440° C. can be reached after 1.2 seconds. Thereafter, further heating can be provided in the thicker region with an unchanged rate of temperature increase up to 680° C. However, the rate of heating in the thinner region can decrease and after 2 seconds a temperature of only 560° C. can be reached. After 2 seconds, a temperature differential in excess of 100 K can occur between the thicker strip portion (higher temperature) and the thinner strip portion (lower temperature).

FIG. 6 shows an example of the temperature curve; as a function of time of a thicker strip portion having a 2.0 mm thickness, and of a thin strip portion with a 1.0 mm thickness. Also shown is the region subjected to induction heating for 10 seconds, which is followed by the region subjected to radiation heating for 45 seconds. In this case, too, it can be seen that by means of the inventive induction heating process, the temperature input can be increased to a much greater extent in the thicker region than in the thinner region, whereas in the radiation furnace an adjustment process takes place which, after a further 30 seconds, leads to identical temperatures in excess of 800° C. Quenching can take place from this temperature onwards, with substantially homogeneous material properties then occurring in the entire strip.

The invention claimed is:

1. A process for the continuous heat treatment of a steel strip material whose thickness periodically varies along its length from a largest thickness ($d_1$) to a smallest thickness ($d_2$), wherein the continuous heat treatment of the strip material takes place while the strip material passes through an induction furnace in which the strip material is induction heated at a constant frequency which has been selected to be such that a mathematical induction depth δ of an induced current up to which a magnetic field has been reduced to 63% of a field strength of an outer field is greater than half the thickness of the strip portions with the smallest thickness ($d_2$).

2. A process according to claim 1, wherein the strip material is induction-heated with a constant frequency which has been selected to be such that the mathematical induction depth δ of the induced current up to which the magnetic field has been reduced to 63% of the field strength of the outer field is smaller than half the thickness of the strip portions with the greatest thickness ($d_1$).

3. A process according to claim 1, wherein the strip portions with different thicknesses ($d_1$, $d_2$) are induction heated to an approximately identical end temperature.

4. A process according to claim 1, wherein the strip portions with different thicknesses ($d_1$, $d_2$) are induction heated to differentiated end temperatures.

5. A process according to claim 1, wherein the strip material is heated in a longitudinal field inductor.

6. A process according to claim 1, wherein the strip material is induction heated, at most, to the Curie temperature (769° C.).

7. A process according to 1, wherein the strip material is induction heated at a heating rate greater than 20 K/sec.

8. A process according to claim 1, further comprising the step of heating the strip material to an even higher temperature, while passing through a convection or radiation furnace following the induction heating process.

9. A process according to claim 8, wherein the strip portions of different thicknesses ($d_1$, $d_2$), are heated to an approximately identical end temperature in the induction or radiation furnace.

10. A process according to claim 8, wherein the strip portions of different thicknesses ($d_1$, $d_2$), are heated to differentiated end temperatures in the induction or radiation furnace.

11. A process according to claim 8, wherein the strip material is cooled at a cooling rate in excess of 40 K/sec after having been heated in the convection or radiation furnace.

12. A process according to claims 1, wherein the strip material is selected in a suitable quality and cooled at a cooling rate for forming polyphase steel.

13. A process according to claim 1, wherein the strip material is flexibly rolled with a roll gap varying as a function of time.

14. A process according to claim 1, wherein the mathematical induction depth δ of the induced current up to which the magnetic field has been reduced to 63% of the field strength of the outer field in the strip portions with the greatest thickness ($d_1$) is greater than half the thickness of the strip portions with the smallest thickness ($d_2$).

15. A process according to claim 1, wherein portions of the induced currents in the strip portions with the smallest thickness ($d_2$) cancel each other out in a region of overlap.

16. A process according to claim 1, wherein the penetration depth σ is calculated as follows:

$$\delta = \frac{1}{2\pi} \cdot \sqrt{\frac{\rho \cdot 10^7}{f \cdot \mu}}$$

with ρ=specific electric resistance, f=frequency, and µ=permeability.

17. A process for the continuous heat treatment of a strip material having opposed surfaces that define a thickness therebetween and having portions along a length thereof that vary in thickness from a largest thickness ($d_1$) to a smallest thickness ($d_2$), the process comprising the step of:

inducing currents to flow within the strip material at depths δ measured from the opposed surfaces of the strip material, wherein the depths δ of the induced currents in the portions of the strip material having the smallest thickness ($d_2$), up to which a magnetic field has been reduced to 63% of a field strength of an outer field, are greater than half the thickness of the portions of the strip material having the smallest thickness ($d_2$).

18. A process according to claim 17, wherein the depths δ of the induced currents in the portions of the strip material having the largest thickness ($d_1$), up to which a magnetic field has been reduced to 63% of a field strength of an outer field, are less than half the thickness of the portions of the strip material having the largest thickness ($d_1$).

19. A process according to claim 17, wherein the depths δ of the induced currents in the portions of the strip material having the largest thickness ($d_1$), up to which a magnetic field has been reduced to 63% of a field strength of an outer field, are greater than half the thickness of the portions of the strip material having the smallest thickness ($d_2$).

20. A process according to claim 17, wherein portions of the induced currents in the strip portions with the smallest thickness ($d_2$) cancel each other out in a region of overlap.

* * * * *